(12) United States Patent
Fedele

(10) Patent No.: US 8,195,474 B2
(45) Date of Patent: Jun. 5, 2012

(54) CUSTOMER PROFILING ENGINE

(75) Inventor: Samuel A. Fedele, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 1482 days.

(21) Appl. No.: 11/044,501

(22) Filed: Jan. 27, 2005

(65) Prior Publication Data

US 2006/0167759 A1    Jul. 27, 2006

(51) Int. Cl.
*G06Q 10/00* (2012.01)
*G06F 15/16* (2006.01)

(52) U.S. Cl. .................. 705/1.1; 707/E17.109; 709/219
(58) Field of Classification Search ............ 705/14, 705/26, 27, 1, 1.1, 7.11, 7.12, 14.4, 14.49, 705/14.51, 14.53, 14.58, 18, 26.1, 29, 30, 705/37, 400; 707/705–708, 713, 999.001, 707/999.002, 999.009, 999.01, E17.107–E17.109; 709/217–219, 212, 238–244
See application file for complete search history.

(56) References Cited

U.S. PATENT DOCUMENTS

| 6,552,813 | B2 | 4/2003 | Yacoub |
| 6,598,087 | B1 | 7/2003 | Dixon, III et al. |
| 6,640,249 | B1 | 10/2003 | Bowman-Amuah |
| 6,645,068 | B1 | 11/2003 | Kelly et al. |
| 6,708,176 | B2 | 3/2004 | Strunk et al. |
| 2003/0069859 | A1* | 4/2003 | Hoffman et al. ............... 705/400 |
| 2003/0163380 | A1 | 8/2003 | Vaccarelli et al. |
| 2005/0125195 | A1* | 6/2005 | Brendel ........................ 702/182 |
| 2005/0226509 | A1* | 10/2005 | Maurer et al. ................ 382/190 |
| 2005/0288600 | A1* | 12/2005 | Zhang et al. .................. 600/510 |

OTHER PUBLICATIONS

Merriam-Webster's Collegiate Dictionary 10th ed. p. 1146 (total 3 pages).*
Merriam-Webster's Collegiate Dictionary 10th ed. p. 1146 (total 3 pages); 2000.*

* cited by examiner

*Primary Examiner* — Igor Borissov
(74) *Attorney, Agent, or Firm* — Fay Sharpe LLP

(57) ABSTRACT

A method and apparatus are provided in a computer network to present marketing and other pertinent information to clients from a host. The client environment is interrogated locally using a profiling engine. A customer class generated by a profiling engine on the customer server controls a URL behind an inquiry tab presented in a client user interface. When the user clicks on the tab they are taken to a portal designed by a host marketing team specifically designed for customers belonging to the customer class designated by the profiling engine. Using the method and apparatus of the present application, direct, cost effective marketing materials are delivered to customers without sending any customer information through the customer firewall back to the host.

18 Claims, 3 Drawing Sheets

CUSTOMER PROFILING ENGINE

BACKGROUND

The present exemplary embodiment relates to the field of marketing goods and services using computer networks. It finds particular application in conjunction with the networking of customers having hardware components, such as printing equipment for example, with vendors of those hardware components to provide customized marketing information to the customers based on the hardware components and their use, and will be described with particular reference thereto. However, it is to be appreciated that the present exemplary embodiments are also amenable to other like applications.

Presently, many servers are installed in the field at client facilities and are adapted to locally collect and store information relative to particular assets of the client. More particularly, existing client servers collect data related to client assets and store the data in a repository such as a local device database or the like. Thus, many client servers are presently at use enriching a body of knowledge which might be used in a marketing context to add to the pool of knowledge about a client.

However, many customers or clients have a sensitivity to vendors, such as printer hardware original equivalent manufacturers (OEMs), peering through a host/client server firewall and into their private and possibly proprietary collection of customer specific information. As a general rule, most clients are disinclined to permit outside vendors or the like from reaching through the firewall and pulling any information back into host servers or, otherwise making local client database information available.

However, making such client information available to marketing groups would enable them to better serve clients with information, offers, rebates, or any other services that may be relevant to a customer's installed base while avoiding supplying the customer with wasteful, unnecessary, and/or unrelated information, offers, or the like.

Accordingly, there is a need in the art for providing proxy data or other information relating a customer's local hardware or device database to a particular marketing profile while avoiding sharing the customer's device database with host organizations such as OEM printer equipment and supply vendors.

BRIEF DESCRIPTION

In accordance with one aspect of the invention, a profiling engine is provided in a network including a first client server at a first customer account and a host server at a vendor's facility. A first software component is provided on the first client server and a second software component is provided at the host server. The first software component executes a profiling algorithm on a set of predefined customer parameters stored in a customer database and assigned the first customer account for the first one of a plurality of predetermined account classes. On the host server, the second software component includes a client user interface presenting an inquiry tab to the first customer account and, when the tab is selected, porting a user at the first customer account to a first portal in accordance with the first one of the plurality of predefined account classes assigned to the first customer account by the first software component. In that way, the customer user interface is used to direct the customer to a portal tailored to the customer's profile. At this site, the customer is presented with information particularly tailored to the customer's needs such as, for example, white -papers on office efficiency and cost reduction, suggestions on relevant products and services, and recommended specific vendor partner solutions. Also, at the tailored portal, the customer may click a button to request additional information or to begin a discussion thread.

In accordance with another aspect of the invention, a profiling engine configured as a software plug-in component is provided on a client server. Using the profiling engine, selected parameters stored in a device database on the client server are interrogated. A first customer class is assigned to the client server. The first customer class is selected from among a plurality of predetermined customer classes based on said interrogating of said selected parameters. Each of the plurality of customer classes is associated with a plurality of URLs, the first customer class being associated with a first URL. Using the first URL associated with the first customer class, a first portal in a host server is indexed or pointed to. In response to an input from a user at the client server, the client is routed to a first site at the host server based on the first URL pointing to the first site. Thereby, the customer or client is directed to a marketing portal specific to the customer's needs based on proxy information relating to the customer's device database. The customer's device database is thereby not directly accessed or divulged to the host server storing the marketing portal.

It is well known in the art to tailor a website view based on user history at the website. However, rather than relying on a user's buying or other observable habits, it is an advantage of the instant application that the user environment itself is interrogated to help decide which or what view(s) to present to the user. It is a further advantage of the instant application that the relevant marketing or business information tailored to the customer's needs are "pulled" from the host or vendor site when the customer actively elects to see this information.

A significant advantage of the method and system of the present invention is the ability to produce and deliver direct, cost effective marketing material without sending any customer information to the host or vendor.

These and other advantages and objects of the present invention will become apparent to those skilled in the art reading and understand the instant application.

DETAILED DESCRIPTION

Figure 1:
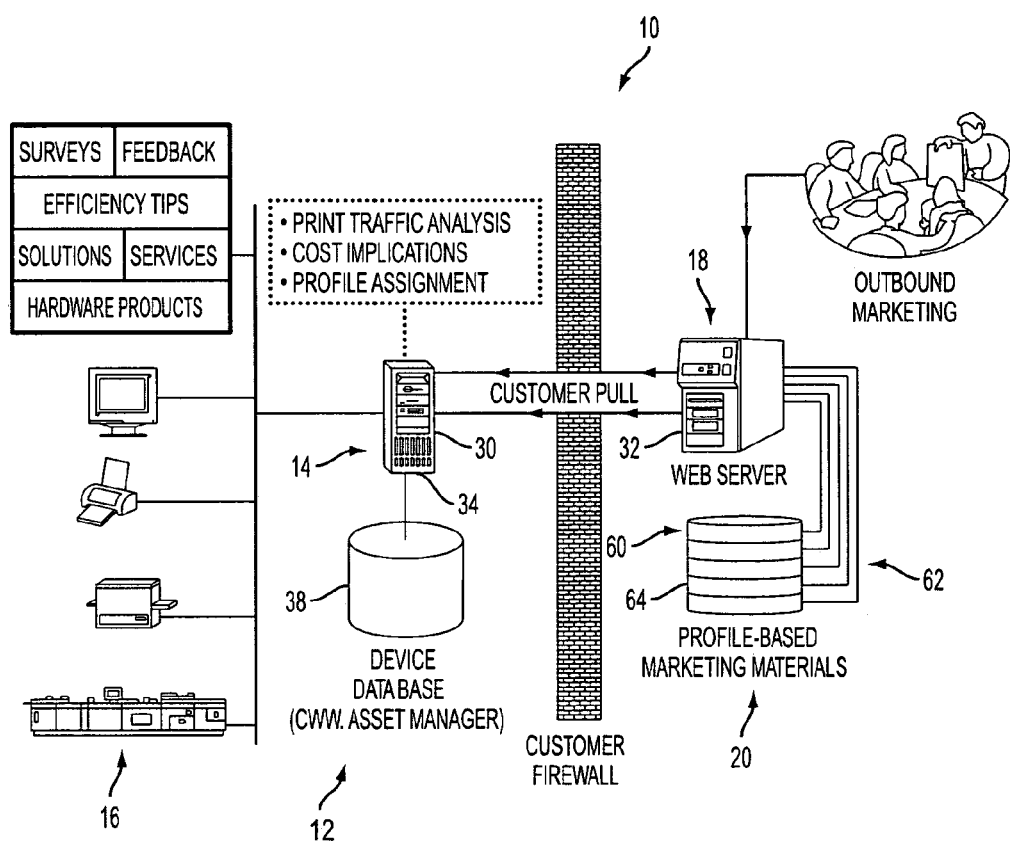
FIG. 1 is a logical diagram of the components of the present invention.
Figure 2:
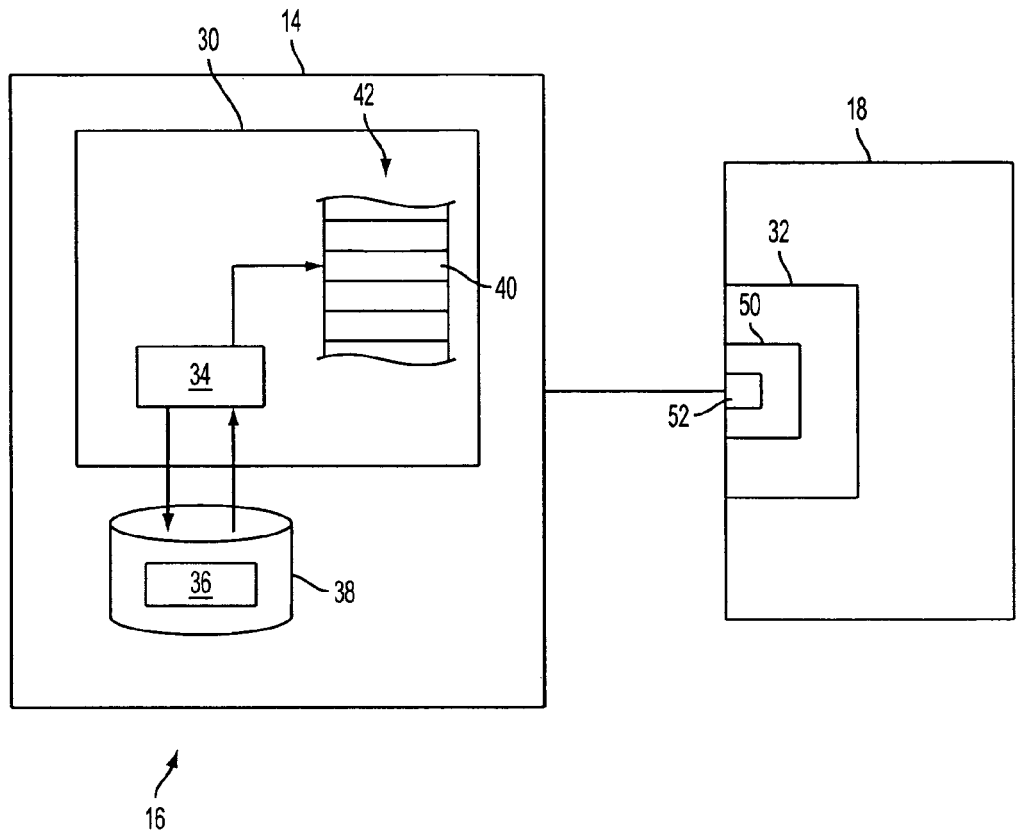
FIG. 2 is a block diagram of the components of the present invention.
Figure 3:
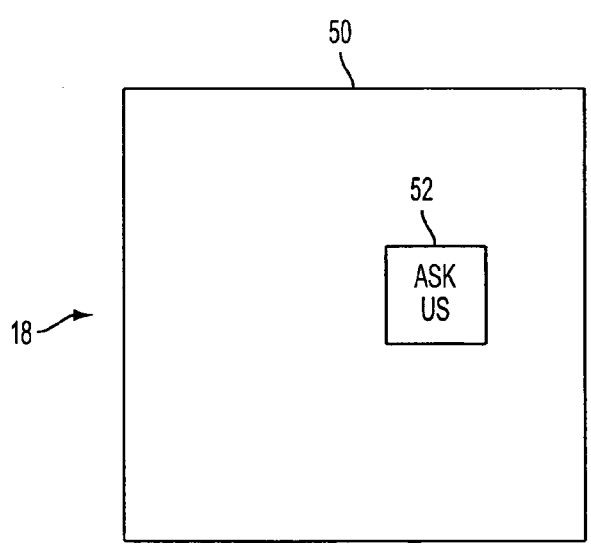
FIG. 3 is a view of a user interface screen according to an aspect of the invention; and, FIG. 4 is process flow chart of a method in accordance with the present invention.

With reference first to FIGS. 1-3, a customer profiling the engine 10 formed in accordance with a preferred embodiment of the present invention is shown in a network 12 including a first client server 14 and a first customer account 16 and a host server 18 at a vendor facility 20. In the preferred embodiment, the first client server 14 and the host server 18 are connected through the internet and are separated by a customer firewall 22. A first software component 30 is provided on the first client server 14 and a second software component 32 is provided on the host server 18. The first software component 14 executes a profiling algorithm 34 on a set of predefined customer parameters 36 stored in a customer database 38. The profiling algorithm 34 assigns the first customer account 16 to a first account classification 40 among a plurality of predefined account classes 42.

On the side of the vendor facility 20, the second software component 32 includes a client user interface 50 including an inquiry tab icon 52 for presentation to the first customer account 16. When the inquiry tab 52 is selected, a user at the first customer account is ported to a first portal 60 from among a plurality of portals 62 stored in a host database 64.

The profiling engine is preferably a software plug-in component operable on the client server to scan the client's device database 38. In typical applications, the device database lists hardware items installed at the customer such as, for example, printer quantities, usage data such as print flows, cost implications relating to color or black and white mode of operation, and the like. The plug-in software component creates marketing defined profiles of the customer from the raw data stored on the device database at the client server. The profiling engine thus places a customer into predefined marketing design profiles.

On the host end 18, the user interface screen 50 is provided with a button 52 inviting a customer to explore additional information the host end which might be interesting or otherwise important to the client such as, for example, special offers, helpful hints, updates, or the like. The client is routed to appropriate portals containing specific information tailored to the client's profile. The tab 52 is essentially a link to the portal 60 created specifically for the profile of a particular customer. Based on a profile of the customer, a wide variety of marketing driven items can be delivered to the customer such as, for example, specific services or solutions that target a customers environment, sale offerings targeted to the customer, and the like. Also, specific tools helpful to the customer for managing their environment can be delivered based on the customer profile developed by the plug-in. As an example, certain suggestions, facts, opportunities to present questions or other inquiries to the host and the like. Thus, in its preferred forms the profiling engine simply returns a pointer to a host server web site that is appropriate to a particular customer's environment and makeup.

Initially, however, before the profiling engine plug-in software components 30, 32 are deployed, a plurality of profiles are defined by an outbound marketing committee or group. After the marketing profiles are developed conceptually, materials corresponding to those profiles are developed or otherwise assembled or stored into a profile based marketing material database 64. That database 64 is stored on a host web server as illustrated or other server. As can be seen from the figure, the profile based marketing material database stored on the host server is separated from the client side by a customer firewall. Using the system shown, the customer device database is not directly accessed by the host web server but, rather, profile based marketing materials are delivered to the customer based on the class or attribute assigned to the customer by interrogating selected parameters stored in the client server database using a plug-in software component. As an example, if the plug-in software component of the profiling engine assigns a customer class "47R" to the client server, then a URL pointer points to a place on the host web server storing the materials developed by the outbound marketing group matching specifically to that profile.

On the customer side 16, one or more software components are stored on the client server 14 and are adapted to mine the client network to discover all SNMP compliant printing devices. Preferably, the software components are one or more of a Centre Ware Web product and an Asset Manager product, both available from Xerox. Of course, the degree of compliancy of each of the hardware devices varies with the manufacturer and the age of the machine, and other factors as well. However, many popular machines currently available have a rich information set.

Using the software components such as, preferably, Centre Ware Web and Asset Manager components, data is collected via an SNMP query. Essentially, all of the hardware items are queried by the software components whereupon machine specific parameters, data, and the like are returned from the machines on the client network to the software components and stored in a device database.

Essentially, the Centre Ware Web component and the Asset Manager component are tools available to the customer for managing their devices including printers and the like. Using these tools, a client can pull up a web interface and determine operating characteristics of devices in the network for management purposes. As an example, using these tools, a client can query the network to determine whether a printer has a paperjam or the like. Thus, proactive action can be taken to resolve malfunctions, errors, usage statistics, requirements, and the like.

Essentially, the profiling engine provided as a software component on the client server mines the data in the device database and assigns a customer class to the client server from among a plurality of customer classes, each being associated with a plurality of customer classes associated with a plurality of corresponding URLs. Using a first URL associated with the first customer class, a first portal in the host server is pointed to and, in response to an input to a user at the client server, the user is routed to a first site at the host server based on the first URL pointing to the first site. There, at the first site, specific marketing information is available to the customer tailored to the customer's particular needs and/or requirements as determined by the profiling engine and class assignment.

In the preferred embodiment, the profiling engine software component plug-in carries a plurality of categories assigned by the outbound marketing group. A plug-in resides on the client server and is preferably bundled as an integral component of one or both of the management components such as, preferably, bundled with the Centre Ware Web package and the Asset Manager package. The plug-in determines a customer profile based upon a plurality of parameters but preferably parameters including the types and quantities of printer devices on the client network, the use demands on those devices, and the like. On the host side, a plurality of parallel web sites are made available, each providing appropriate information according to a plurality of profiles defined by the outbound marketing group. On the client side, based upon a profile assigned to the client by the profiling engine plug-in, the customer is routed to the appropriate web page when a predefined tab or the like is selected by the client provided in a user interface screen or the like. When the client clicks on the offer tab 52, the interface is updated to a screen drawn from one of a plurality of profile based marketing material components according to the profile assigned to the customer.

Thus, using the system described above, marketing materials can be presented to clients without exposing client sensitive information stored on the client side of a customer firewall. Rather, a proxy token or pointer assigning a customer class to a client is used to pull profile based marketing materials from the host server to the client server based on the assigned customer class.

Figure 4:
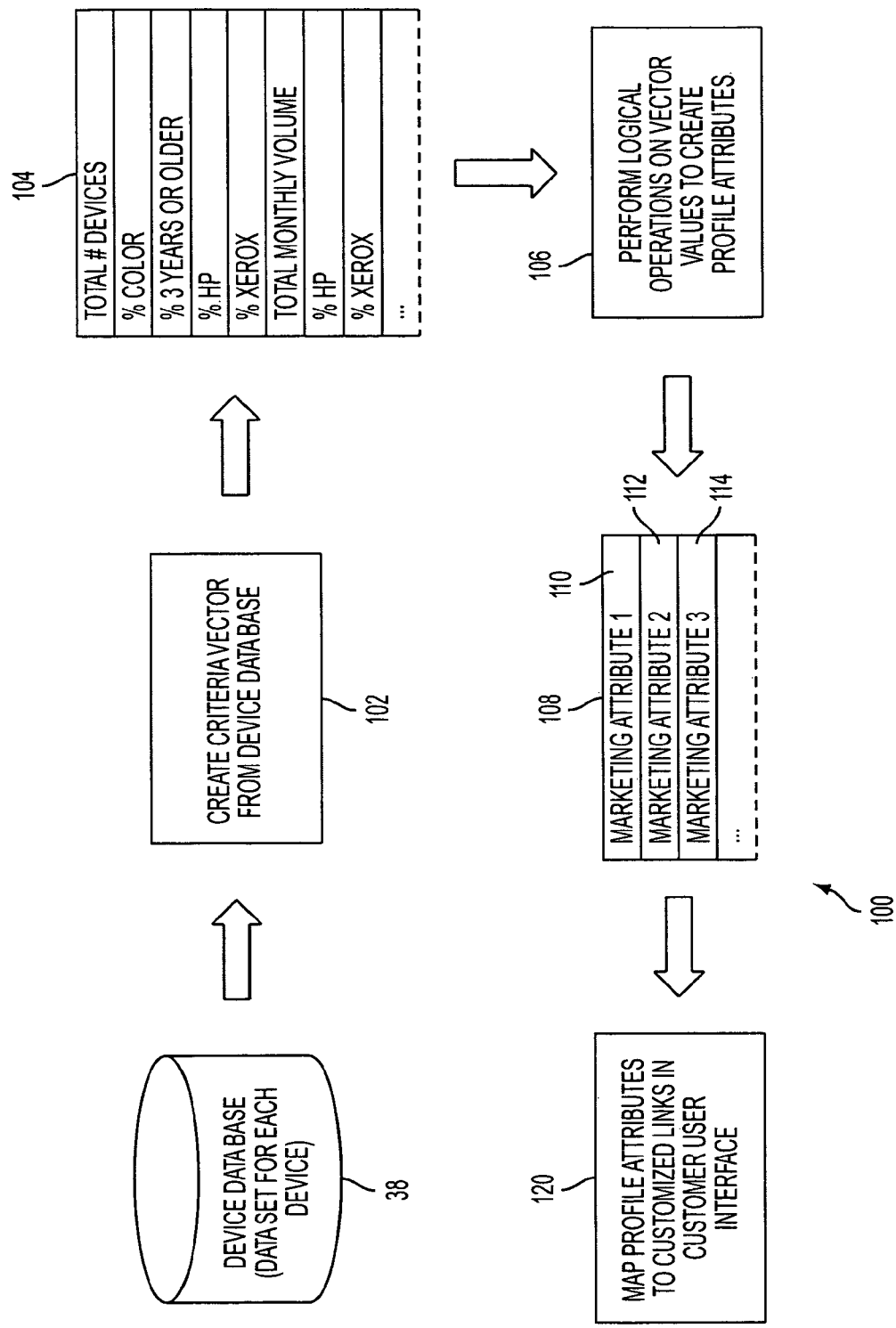

FIG. 4 shows a process flow in accordance with a preferred method 100 of delivering customized marketing material to a client server in accordance with an embodiment of the present invention. With reference now to that figure, a profiling engine is provided as a software component on a client server. Using the profiling engine, selected parameters stored in a customer database 38 are interrogated to create, at step 102, one or more criteria vectors 104 from the device database 88. In their preferred form, the criteria vectors may include such information such as the total number of imaging devices at the vendor facility 20, the number of color devices, the number of devices from particular vendors, or the like.

At step 106, one or more logical operations are performed on vector values to create profile attributes 108. The profile attributes are illustrated in FIG. 2 as a list of marketing attributes 110-114 and may include, for example, such attributes as a customer's reluctance to migrate to color printers, a customer's preference for one or more document device vendors, a high or lower total monthly throughput volume, or the like.

Lastly, at step 120, a mapping is performed on the profile attributes to map the attributes to customized links in the customer user interface 50 described above.

The invention has been described based upon the preferred embodiments. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives modifications, variations, improvements, and substantial equivalents.

The invention claimed is:

1. In a network, a customer profiling system comprising:
a first client server being configured:
to implement a first customer account,
to perform a profiling algorithm on a set of predefined customer parameters, and
to assign said first customer account to a first one of a plurality of predefined account classes; and,
a host server at a vendor facility, said host server separated from said first client server by a customer firewall and being configured:
to present an inquiry tab to said first customer account and,
when said tab is selected, to port a user at said first customer account to a first portal in accordance with said first one of said plurality of predefined account classes assigned to said first customer account;
wherein said first client server includes a device database storing information relating networked devices at said first customer account;
wherein said profiling algorithm is configured to generate profile attributes and said first one of said plurality of defined account classes based on said device database; and
wherein said device database is not directly accessed by said host server.

2. The customer profiling system according to claim 1 wherein said first client server includes a device database storing information relating to imaging and document devices at said first customer account.

3. The customer profiling system according to claim 1 wherein:
said profiling algorithm is configured to
i) create a criteria vector from said device database, and
ii) perform logical operations on vector values of said criteria vector to generate said profile attributes.

4. The customer profiling system according to claim 3 wherein:
said host server is configured to port said user at said first customer account to said first portal by associating said first customer account class with a URL.

5. The customer profiling system according to claim 4 wherein said first portal includes at least one of marketing and maintenance information useful to said user at said first customer account based on said assigned first account class.

6. The customer profiling system according to claim 5 wherein said first portal includes at least one of white paper information, office efficiency information, and cost reduction information relevant to said first customer account.

7. The customer profiling system according to claim 4 wherein said profiling algorithm is configured to generate said profile attributes as said first one of said plurality of predefined account classes based on parameters stored in said device database including: hardware device mix data, printed page volume data, fault history data, usage information, and page cost information.

8. The customer profiling system according to claim 1 wherein the host server presents the inquiry tab to said first customer account and ports the user to the first portal in accordance with the assigned class without any access to said customer parameters.

9. In a computer network, including a client server and a host server, a method of directing a user of the client server to a site at the host server without transferring client data/information from the client server to the host server, the method comprising:
providing a database on said client server, said database storing client data;
preventing the host server from directly accessing the database;
providing a profiling engine as a software component on said client server;
searching selected parameters stored in the database using said profiling engine;
using the profiling engine, assigning a first customer class to said client server from among a plurality of customer classes based on the searched parameters, each of said plurality of customer classes being associated with a plurality of URLs, said first customer class being associated with a first URL;
using said first URL associated with said first customer class, pointing to a first portal in said host server; and,
in response to an input from a user at said client server, directing said user to a first site at said host server based on said first URL pointing to said first site.

10. A network system comprising:
a first client server configured to execute a profiling algorithm on a set of predefined customer parameters and to assign a first customer account to a first one of a plurality of predefined account classes;
a host server configured to execute a client user interface presenting an inquiry tab to said first customer account and, when said tab is selected, to port a user at said first customer account to a first portal in accordance with said first one of said plurality of predefined account classes assigned to said first customer account by said first client server; and
a firewall separating the first client server from the host server;
wherein said first client server includes a device database storing information relating networked devices at said first customer account;

wherein said profiling algorithm is configured to generate profile attributes and said first one of said plurality of defined account classes based on said device database; and wherein said firewall is configured to prevent direct access to the device database by the host server.

11. The network system according to claim 10 wherein said first client server includes a device database storing information relating to imaging and document devices at said first customer account.

12. The network system according to claim 10 wherein:
said profiling algorithm is configured to i) create a criteria vector from said device database, and ii) perform logical operations on vector values of said criteria vector to generate said profile attributes.

13. The network system according to claim 12 wherein:
said host server is configured to port said user at said first customer account to said first portal by associating said first customer account class with a URL.

14. The network system according to claim 13 wherein said first portal includes at least one of marketing and maintenance information useful to said user at said first customer account based on said assigned first account class.

15. The network system according to claim 14 wherein said first portal includes at least one of white paper information, office efficiency information, and cost reduction information relevant to said first customer account.

16. The network system according to claim 13 wherein said profiling algorithm is configured to generate said profile attributes as said first one of said plurality of predefined account classes based on parameters stored in said device database including: hardware device mix data, printed page volume data, fault history data, usage information, and page cost information.

17. A computer network comprising:
a client server; and
a host server;
said client server being configured to interrogate selected parameters stored in a database on said client server and to assign a first customer class to said client server from among a plurality of customer classes based on the interrogation, each of said plurality of customer classes being associated with a plurality of URLs, said first customer class being associated with a first URL; and
said host server being configured to point to a first portal in said host server using said first URL, and to direct said user to a first site at said host server based on said first URL pointing to said first site in response to an input from a user at said client server;
wherein the host server points to the first portal and directs said user to the first site at said host server based on said first URL without any access to the database on said client server.

18. The computer network of claim 17, further comprising a firewall separating the client server and the host server.

* * * * *